J. RUBENSTEIN.
SAFETY GUARD FOR VEHICLES.
APPLICATION FILED NOV. 29, 1916.
1,218,583.
Patented Mar. 6, 1917.
3 SHEETS—SHEET 1.
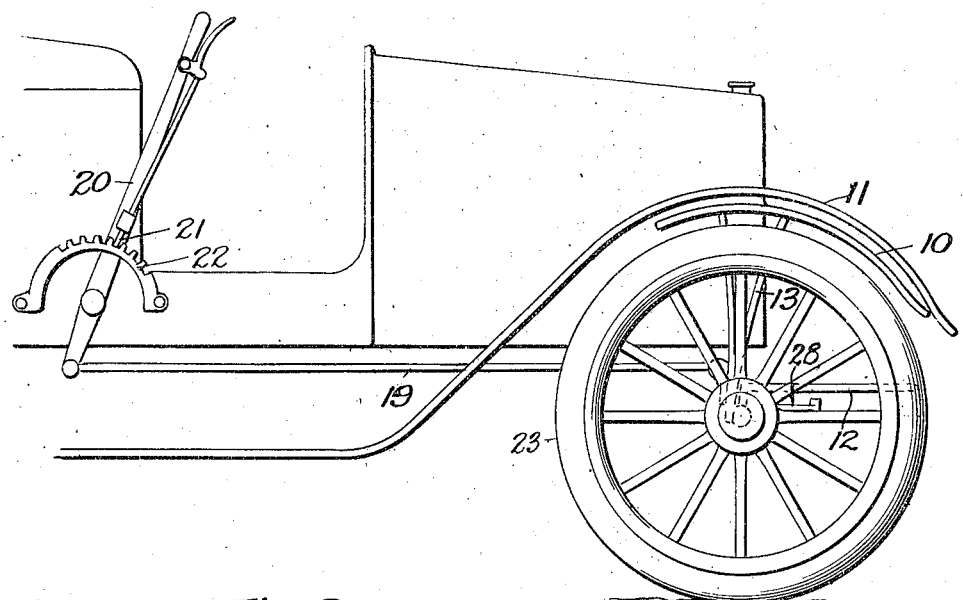
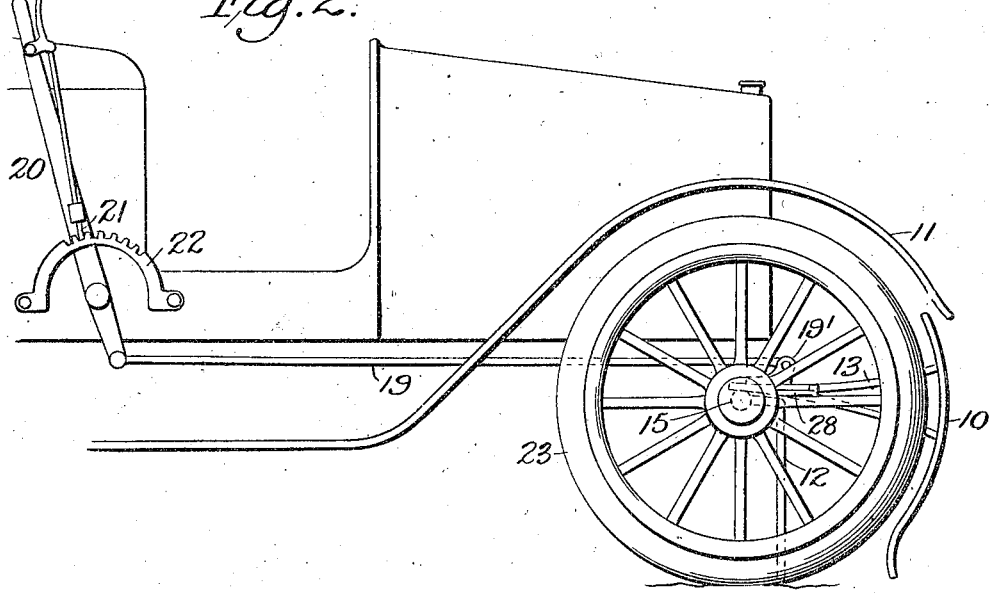
Inventor
Jacob Rubenstein
By his Attorney
James F. Duhamel

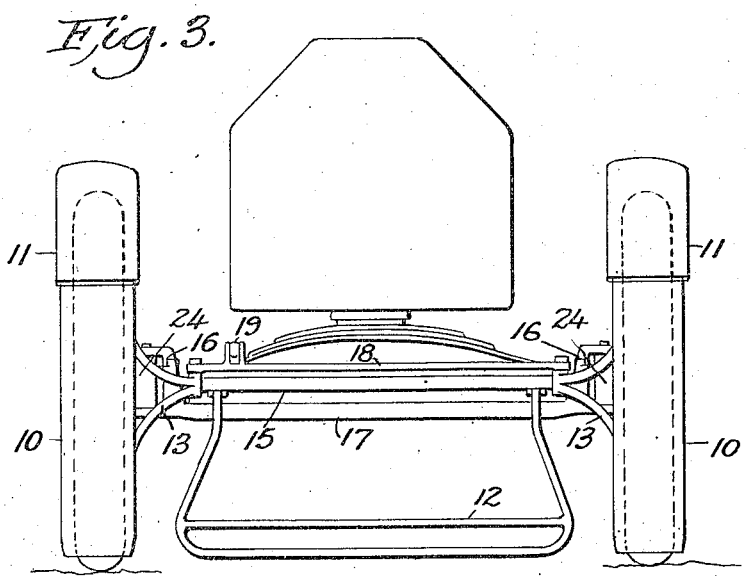
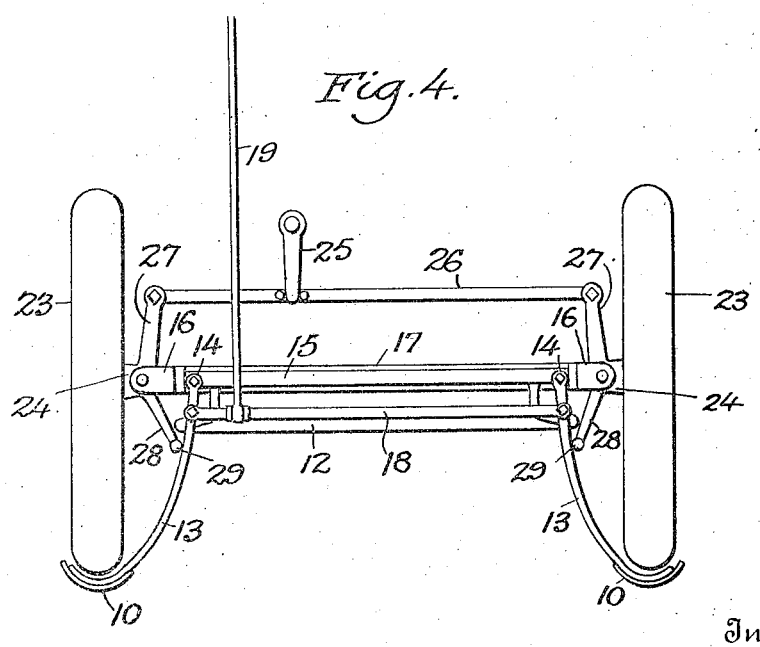

J. RUBENSTEIN.
SAFETY GUARD FOR VEHICLES.
APPLICATION FILED NOV. 29, 1916.

1,218,583.

Patented Mar. 6, 1917.
3 SHEETS—SHEET 3.

Inventor
Jacob Rubenstein
By his Attorney
James F. Duhamel

UNITED STATES PATENT OFFICE.

JACOB RUBENSTEIN, OF NEW YORK, N. Y.

SAFETY-GUARD FOR VEHICLES.

1,218,583.  Specification of Letters Patent.  Patented Mar. 6, 1917.

Application filed November 29, 1916. Serial No. 134,182.

*To all whom it may concern:*

Be it known that I, JACOB RUBENSTEIN, a citizen of the United States, and resident of New York, in the county of Bronx and State of New York, have invented certain new and useful Improvements in Safety-Guards for Vehicles, of which the following is a specification.

This invention relates to safety guards for vehicles and especially to fenders adapted to be normally elevated but which may be thrown down by the driver of the vehicle when the latter approaches a person or object liable to be killed or injured. The device also includes guards adapted to be let down in advance of the wheels and adapted to turn on a pivot to conform with the direction taken by the said wheels.

These and other objects and details of the invention will be more fully described in the following specification, set forth in the claims and illustrated in the accompanying drawings wherein:

Figure 1 is a side view of an automobile showing the guards elevated.

Fig. 2 is a similar view with the guards in their operative position.

Fig. 3 is a front view of the vehicle.

Fig. 4 is a plan view of the front axle and with the guards thrown down.

Figure 5:
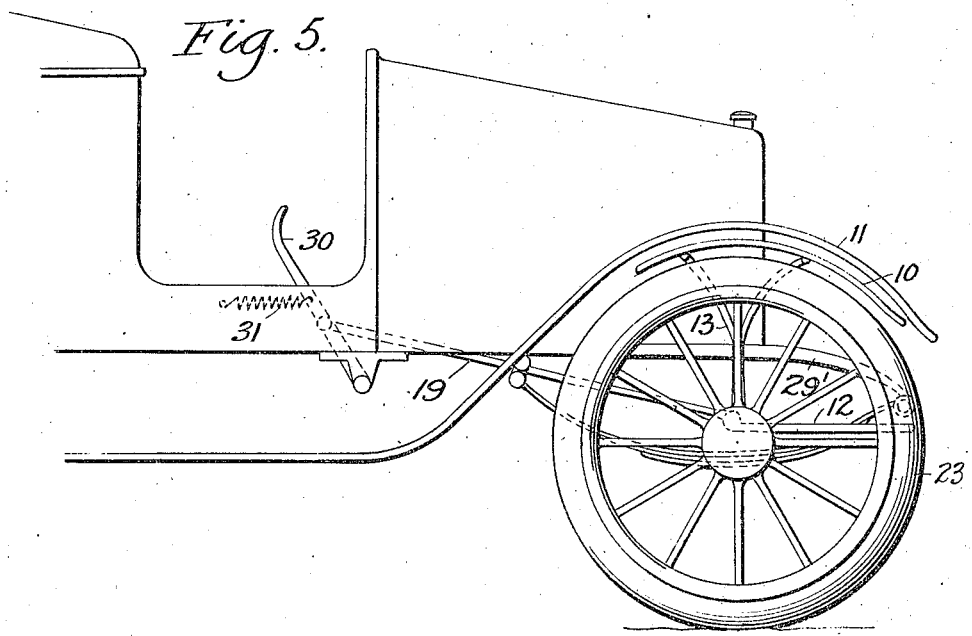
Fig. 5 is a side view of a modified form of the invention.

When the guards are elevated to their inoperative position they are so hidden and disguised as to deprive the vehicle of none of its usual appearance, the wheel guards 10 being hidden beneath the usual mud guards 11 of the vehicle as shown in Fig. 1 and the fender 12 being elevated to a horizontal position where it appears as a protecting bar or buffer.

The guards 10 are located immediately adjacent the wheels, being adapted to cover about a quarter of its edge, and are carried by forked frames 13 pivoted at 14 to a cross bar 15 journaled in the forks 16 of the axle 17, all of which is best shown in Fig. 4. The frames 13 are arms united by a bar 18 which is connected by a rod 19 with the lower end of a lever 20 pivoted to the side of the vehicle body and at a convenient point for the driver. This lever 20 may be provided with the usual pawl 21 and rack segment 22 to retain the lever and the guards at any desired point.

The vehicle wheels 23 are carried by the usual steering knuckles 24 and the latter are operated by the arms 25 acting on the shifting bar 26 to throw the wheels at an angle to direct the course of the car and connected with the arms 27, while at the other side of the knuckles are the arms 28 with heads 29 to bear upon the frames 13 and shift the guards 10 with the wheels when turns are made. The guards and the shaft 18 are thus shifted regardless of the rod 19 and do not interfere with the operation of the lever 20 as the wheels are directed in their proper course.

Figure 6:
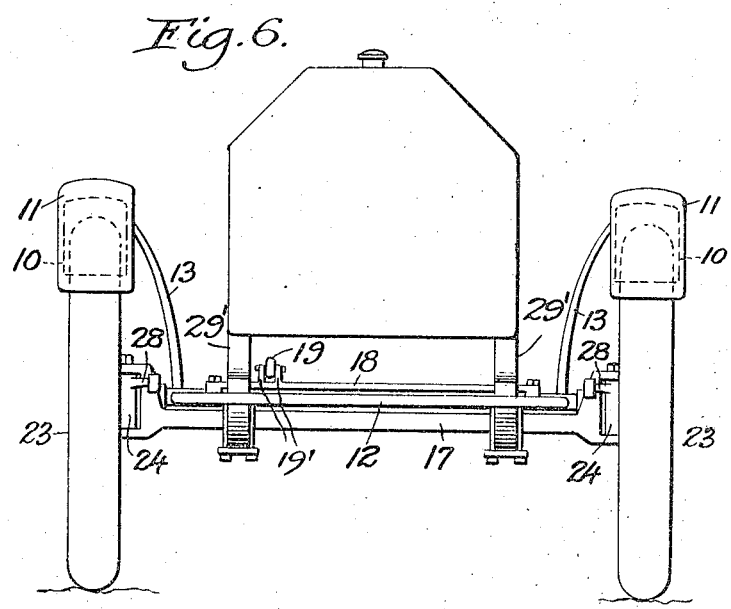
Fig. 6 is a front view of the same.

In the modified form shown in Figs. 5 and 6 a different vehicle spring 29' is shown extending beyond the fender 13 and limiting the upward movement of the same. The construction and arrangement of the fender and the guards with their shifting means are the same already explained, but the rod 19 is connected with the bar 18 by the ears 19' as above referred to.

In the latter form of the device the rod 19 is operated by the foot lever 30 and the guards retained in their elevated position normally by the spring 31.

Should the driver feel that there is danger of a person being run down or struck by the vehicle he can immediately drop his guards before applying his brake or in case that he is moving through a crowded street the guards may be lowered and kept in that position until he has passed the danger point.

When the wheels are turned to change the course of the vehicle the tires themselves will control the shift of the guards 10 if the heads 29 should fail to work, especially if the guards are dropped while the wheels are shifted.

It is obvious that the fender 12 may be light and flexible in construction to ease its impact when striking a person and the light construction of the guards will prevent their injuring a person when struck. The parts may be otherwise arranged and modified without departing from the essential features above described or from the scope of the appended claims.

What I claim as new is:

1. In safety guards for vehicles, the combination with the mud guards thereof, of safety guards adapted to lie between the mud guards and the front wheels, a bar journaled on the front axle, arms from the bar carrying the safety guards, and means for rotating the bar.

2. In safety guards for vehicles, the combination with a bar journaled on the front axle of the same, of arms pivoted on the bar, guards at the outer ends of the arms, means connected with the wheels for moving the guards as the wheels change their course, and means for swinging the bar and guard.

3. In safety guards for vehicles, the combination with the front axles and wheels, of a bar journaled on the axle and carrying a fender, arms pivoted on the bar, guards at the ends of the arms, mud guards protecting the same when inoperative, and means for rotating the bar and shifting the guard and fender.

4. In safety guards for vehicles, the combination with the front axles and wheels, of a bar journaled on the same, arms pivoted on the bar, guards at the outer ends of the arms, means for moving the arms in unison, and mud guards to protect the guards when elevated.

5. In safety guards for vehicles, the combination with the front axle thereof, of mud guards secured to the vehicle, safety guards normally located under the mud guards, arms carrying the safety guards, a rotating bar on the axle on which the arms are pivoted, means for rotating the bar, means for swinging the arms on their pivots, and a fender carried by the bar.

6. In safety guards for vehicles, the combination with the mud guards, of safety guards normally located under the mud guards and adapted to be thrown down before the front wheels, means for operating the safety guards, and means for shifting the safety guards with the wheels.

7. In safety guards for vehicles, the combination with the front axle of the vehicle, of a bar journaled thereon, arms pivoted on the bar, a rod connecting the arms, guards at the outer ends of the arms, means for shifting the arms on the bar, means for lowering the arms and guards, and mud guards for protecting the latter when elevated.

Signed at New York, in the county of New York and State of New York, this 23d day of November, A. D. 1916.

JACOB RUBENSTEIN.